United States Patent [19]
Rettke

[11] Patent Number: 5,620,324
[45] Date of Patent: Apr. 15, 1997

[54] EDUCATIONAL KIT INCLUDING SEPARABLE ALPHANUMERIC SYMBOLS

[76] Inventor: Robert S. Rettke, 9900 Avenue West, Apt. 22, Everett, Wash. 98204

[21] Appl. No.: 559,554

[22] Filed: Nov. 16, 1995

[51] Int. Cl.$^6$ ........................................ G09B 1/36
[52] U.S. Cl. .................................. 434/160; 434/193
[58] Field of Search ..................... 434/160, 159, 434/193, 406, 171; 273/156; D19/59; D21/104

[56] References Cited

U.S. PATENT DOCUMENTS

| | | |
|---|---|---|
| 187,420 | 2/1877 | Schmitthenner . |
| 3,728,800 | 4/1973 | Magram ................................. 434/171 |
| 4,037,846 | 7/1977 | Zeeman . |
| 4,690,410 | 9/1987 | Berton ................................. 434/171 X |
| 4,877,405 | 10/1989 | Stewart . |
| 4,998,883 | 3/1991 | Brinkley . |
| 5,161,976 | 11/1992 | Crowe . |
| 5,230,508 | 7/1993 | Tabler . |
| 5,405,135 | 4/1995 | Embro . |

FOREIGN PATENT DOCUMENTS

| | | |
|---|---|---|
| 986961 | 8/1951 | France . |
| 1174184 | 3/1959 | France . |

OTHER PUBLICATIONS

"Number fun comes canned", Playthings, p. 48. Dec. 1971.

*Primary Examiner*—Jeffrey A. Smith
*Attorney, Agent, or Firm*—Richard C. Litman

[57] ABSTRACT

An educational kit for instilling in children a positive self-image at an early age. The kit (known as "ALPHA BLOCKS") teaches young children the complete alphabet and numeral system in a way that is fun, captivating, hands-on and helps them acquire understanding of divergent shapes and colors. The kit includes alphanumeric symbols ranging from the letters of the alphabet to numerals 0 to 9. The symbols are separable into dual sections via a dovetail and groove connection. The dovetail and groove connection ensures a strong and study attachment that permits easy separation of the symbols by the children. Each symbol has a unique color that helps distinguish it from the other symbols. This assists the children in assembling the symbols and also helps them develop the ability to distinguish colors. Included also in the kit is a receptacle useful in storing the complete set of alphanumeric symbols and displays each individual symbol (with its appropriate color) in both an attached and detached arrangement. Both the symbols and receptacle are made of plastic and together help children gain self-esteem and knowledge in a way that is both fun and educational.

11 Claims, 5 Drawing Sheets

EDUCATIONAL KIT INCLUDING SEPARABLE ALPHANUMERIC SYMBOLS

BACKGROUND OF THE INVENTION

1. Field of the Invention

The present invention relates to a decorated educational kit consisting of a plastic container within which plastic blocks depicting letters of the alphabet, along with the numerals 0 to 9 are contained, and wherein the plastic blocks are useful as a learning tool for teaching children the alphabet and numbers.

2. Description of the Prior Art

Children and particularly young children learn best by "touching" and "feeling," especially during their formative years. Children at a young age have not learned, much less mastered, the art of conceptual or abstract thinking. Therefore, whenever children can hold, observe close-up, or simply touch the object of instruction, they gain a much greater knowledge than if they had simply read about the object of instruction. When children can touch or play with teaching instruments their normally short attention spans are increased. While playing with the teaching gadgets the children are actually learning and enjoying themselves at the same time. As with adults, children tend to spend more time, energy and enthusiasm in activities they enjoy. When children learn more and see that learning can be fun, their desire and ability to learn increases and results in a heightened self-esteem.

All parents want their children to grow up having a healthy self-esteem. An effective way to achieve this is to instill in children at an early age a great amount of self-confidence in their ability to learn. This happens when parents provide learning opportunities for their children that are both fun and appropriate for their age. The children learn while having fun and then desire to learn more. A practical technique for inspiring young minds to learn is to start with learning the alphabet. If children can be taught to learn the alphabet in a way that is both fun and effective then the children will be well on their way to developing a love and joy for learning. There is, therefore, a need for a learning kit for teaching children the alphabet and numbers that allows for hands-on learning, is constructed such that each alphanumeric symbol is of a separate color, is three-dimensional to teach object recognition, includes a container made of the same material as the letters with a picture of each letter (assembled and disassembled) thereupon, is fun to play with, and is safe for small children. The present invention provides such a device.

Educational type toys have been described in the patent literature. For example, U.S. Pat. No. 5,230,508 issued to Tabler on Jul. 27, 1993, and French Pat. No. 986,961 published on Aug. 7, 1951, both describe alphanumeric symbols, but fail to show symbols having distinct colors that are positioned together using a dovetail and groove arrangement that ensures a solid and secure attachment of symbols. In addition, neither patent discloses a kit having a container of sufficient size to house all of the symbols and that displays all of the symbols in an assembled and disassembled format to assist the children in object recognition.

U.S. Pat. No. 4,998,883 issued to Brinkley on Mar. 12, 1991, and 187,420 issued to Schmitthenner on Feb. 13, 1877, both describe educational alphanumerical symbols but do not teach attaching the separate parts of the symbols together using a dovetail and groove arrangement, and also fail to teach a kit having a container that displays all of the symbols in both an assembled and disassembled state.

U.S. Pat. No. 5,405,135 issued to Embro on Apr. 11, 1995, U.S. Pat. No. 5,161,976 issued to Crowe on Nov. 10, 1992, U.S. Pat. No. 4,877,405 issued to Stewart on Oct. 31, 1989, U.S. Pat. No. 4,037,846 issued to Zeeman on Jul. 26, 1977, and French Pat. No. 1,174,184 published on Mar. 6, 1959, all describe block alphanumeric symbols but do not disclose symbols attached via a dovetail and groove arrangement.

None of the above inventions and patents, taken either singly or in combination, is seen to describe the instant invention as claimed.

SUMMARY OF THE INVENTION

The present invention relates to an educational kit for teaching young children the alphabet comprising alphanumeric symbols A through Z and 0 to 9. The symbols are comprised of two parts that are affixed together by a dovetail and groove attachment. The symbols are of sufficient size to allow the children to easily play with and manipulate each symbol into and out of attached relationship. Each letter and number have a separate color to assist the children in putting together the symbols. The separate colors for each symbol also teach the children to identify various and diverse colors. Each symbol is made of a strong, durable plastic having no sharp edges that could hurt the children. By assembling together the figures the children develop hand to eye coordination, motor skills and the ability to recognize letters, numerals and colors therefore cultivating in them a positive self-image and high self-esteem.

Included in the kit is a container dimensioned and configured to hold all of the alphanumeric figures while displaying on the exterior of the container all of the alphanumeric symbols in both an assembled and unassembled form. This provides for the children a visual representation of the symbols that will assist the children in properly constructing the individual symbols while teaching them how to assemble items by observing the items in completed and uncompleted form.

Accordingly, it is a principal object of the invention to provide an educational kit comprised of alphanumeric symbols depicting the alphabet and numerals 0 through 9.

It is another object of the invention to provide alphanumeric symbols that are attached together via a dovetail and groove arrangement.

It is a further object of the invention to provide an educational kit wherein the symbols are made of plastic and are devoid of sharp edges.

Still another object of the invention is to provide an educational kit wherein the symbols are large enough to be easily handled by small children.

An additional object of the invention is to provide and educational kit having a container large enough to accommodate all the alphanumeric symbols.

It is again an object of the invention to provide is to provide a container which is made of the same material as the symbols.

Yet another object of the invention is to provide is to provide a container that displays all of symbols in both attached and detached form.

It is an object of the invention to provide improved elements and arrangements thereof in an apparatus for the purposes described which is inexpensive, dependable and fully effective in accomplishing its intended purposes.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
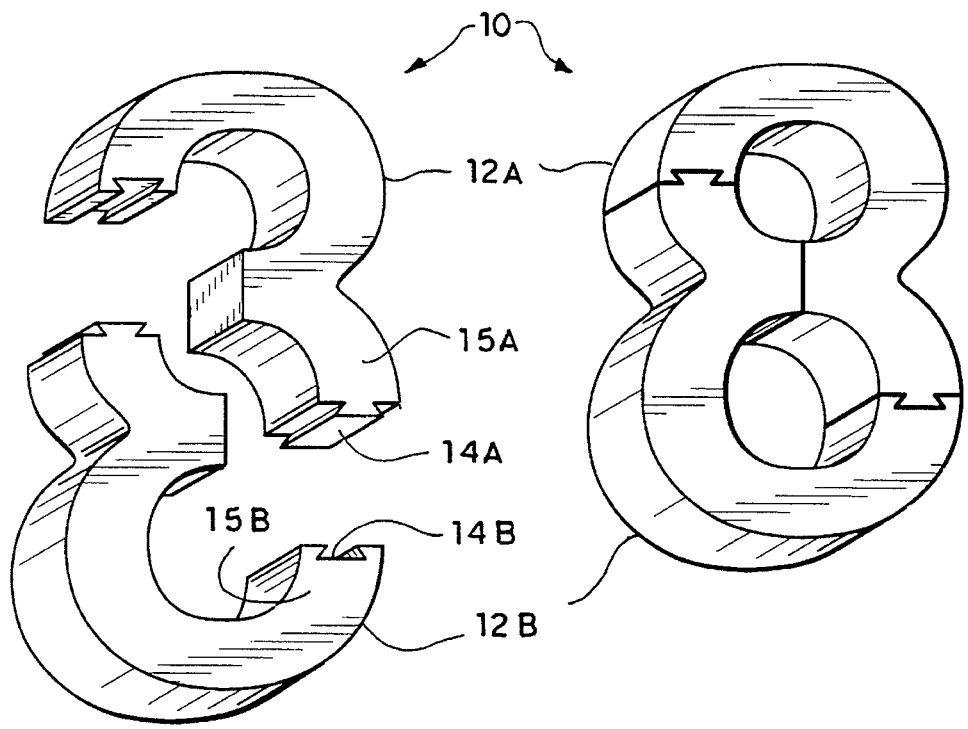
FIG. 1 is a front perspective view of the numeral 8 shown in both attached and detached relationship.
Figure 2:
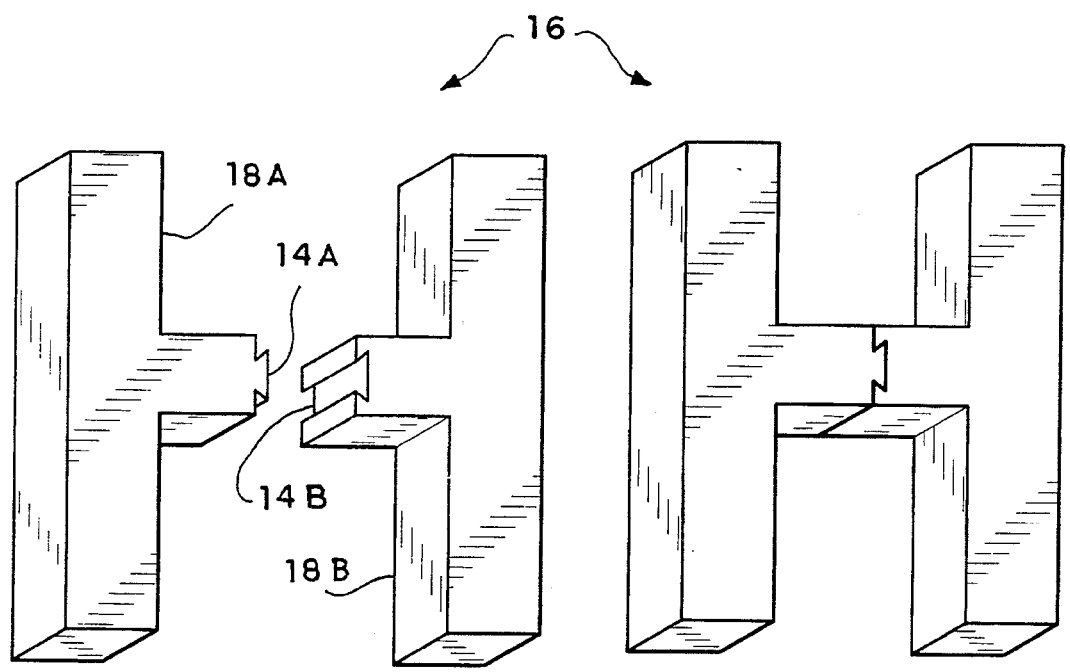
FIG. 2 is a front perspective view of the letter H shown in both attached and detached relationships.

Turning now to FIG. 1 and FIG. 2 of the drawings, alphanumeric symbols "eight" 10 and "H" 16, respectively, are shown in an attached and a detached relationship. Alphanumeric symbols 10, 16 are representative of various symbols of the present invention that are formed from two separate parts. The symbol "eight" 10 has an upper section 12A and a lower section 12B, whereas symbol "H" 16 has a left section 18A and a right section 18B. To connect the sections together, a dovetail 14A and groove 14B arrangement is utilized. The child simply aligns the dovetail 14A with the groove 14B and then slides dovetail 14A down into groove 14B. The child slides dovetail 14A down into groove 14B until the top surface 15A of upper section 12A is aligned with the top surface of 15B of the lower section 12B. The dovetail attachment ensures a snug fit between dovetail 14A and groove 14B. The attachment provides a sure connection that will not disconnect due to simple movement of and playing with the symbols by the child. Only when the child slides dovetail 14A out of engagement with groove 14B will the sections 15A, 15B separate. The connection is tight enough to prevent accidental separation of the symbols, but not so tight as to cause difficulty to the children in disassembling the symbols. The ability to disconnect and reconnect the symbols gives the children the opportunity to learn, play with, and distinguish various shapes. Since each alphanumeric symbol has a unique color, the children can look for like colors when assembling the symbols. This will help the children not only learn color recognition, but also will assist them in putting together the symbols.

Figure 3:
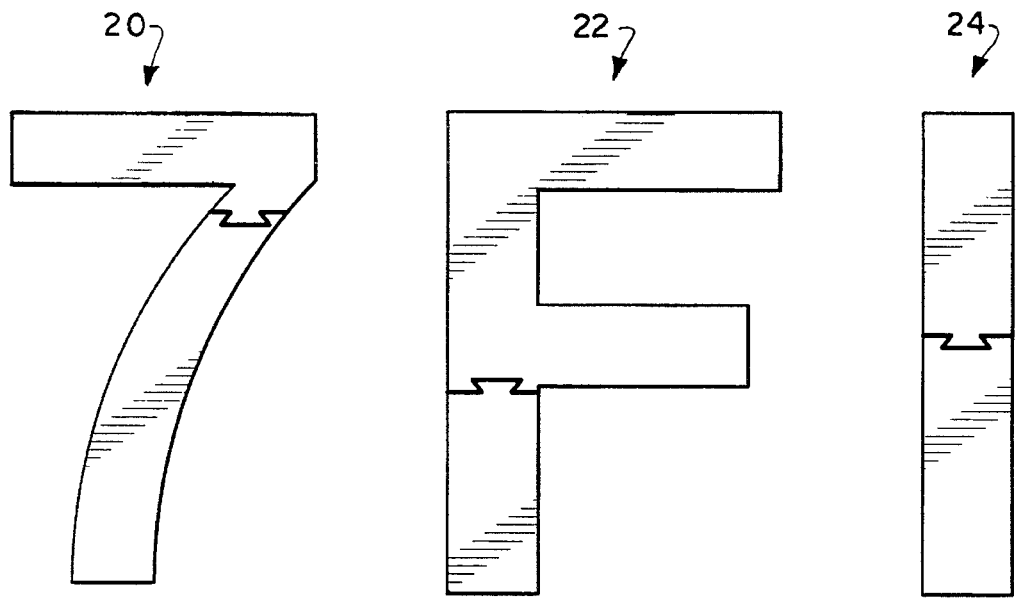
FIG. 3 is a front elevational view of attached symbols having a single attachment point.
Figure 4:
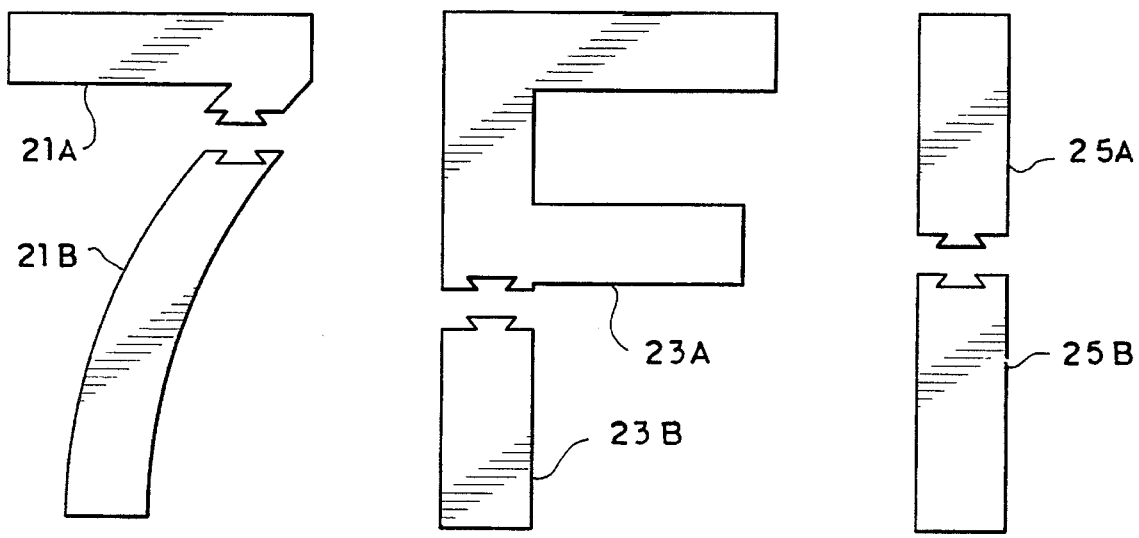
FIG. 4 is a front elevational view of detached symbols having a single attachment point.

Turning to FIG. 3 of the drawings, alphanumeric symbols "seven", "F" and "I", which are respectively 20, 22, and 24, show symbols separated into an upper and lower section. FIG. 4 shows upper sections 21A, 23A, 25A separated from lower sections 21B, 23B, 25B, respectively. The symbols in FIG. 3 and FIG. 4 use a single attachment.

Figure 5:
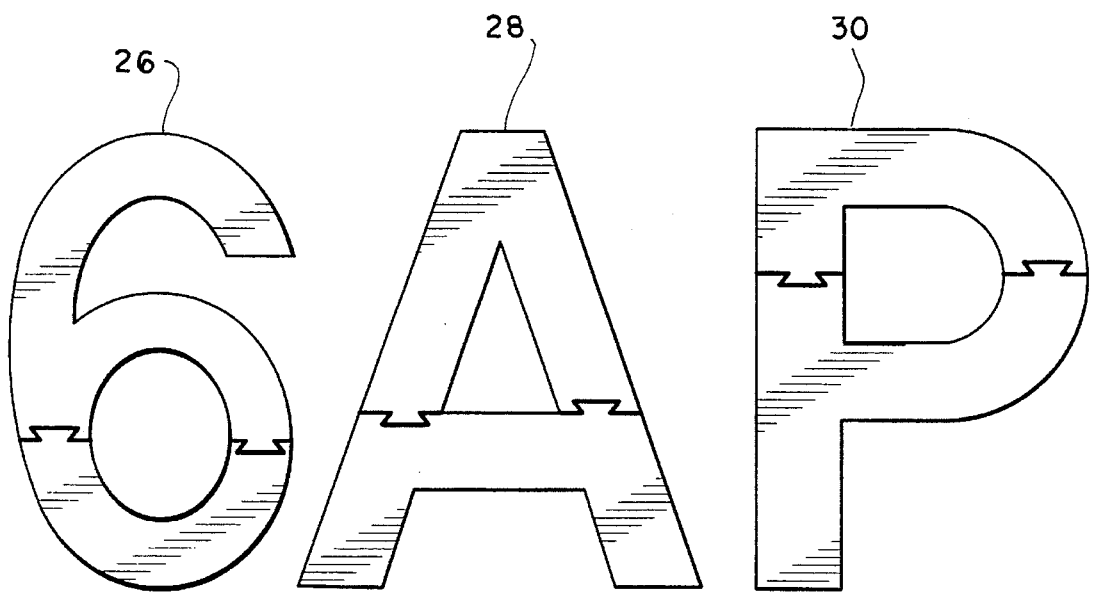
FIG. 5 is a front elevational view of attached symbols having double attachment points.
Figure 6:
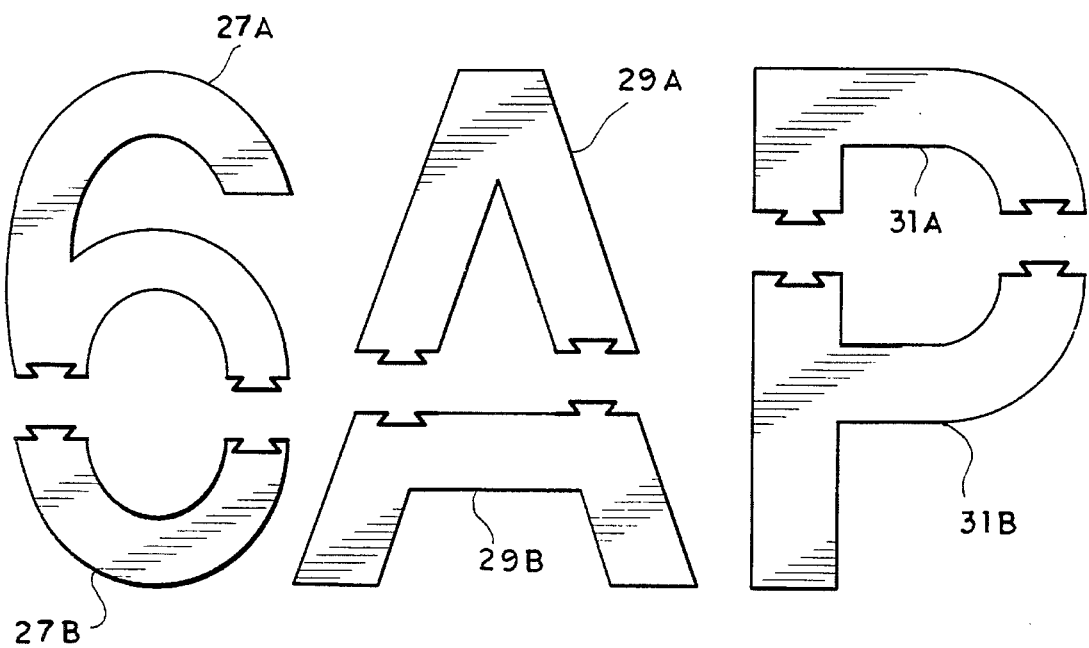
FIG. 6 is a front elevational view of detached symbols having double attachment points.
Figure 7:
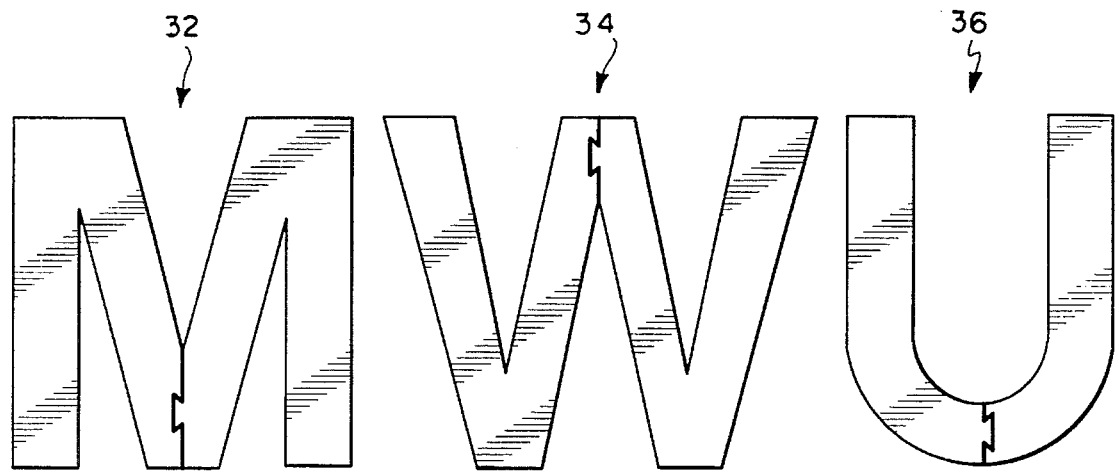
FIG. 7 is a front elevational view of attached symbols having an attachment point at the center of the symbols.
Figure 8:
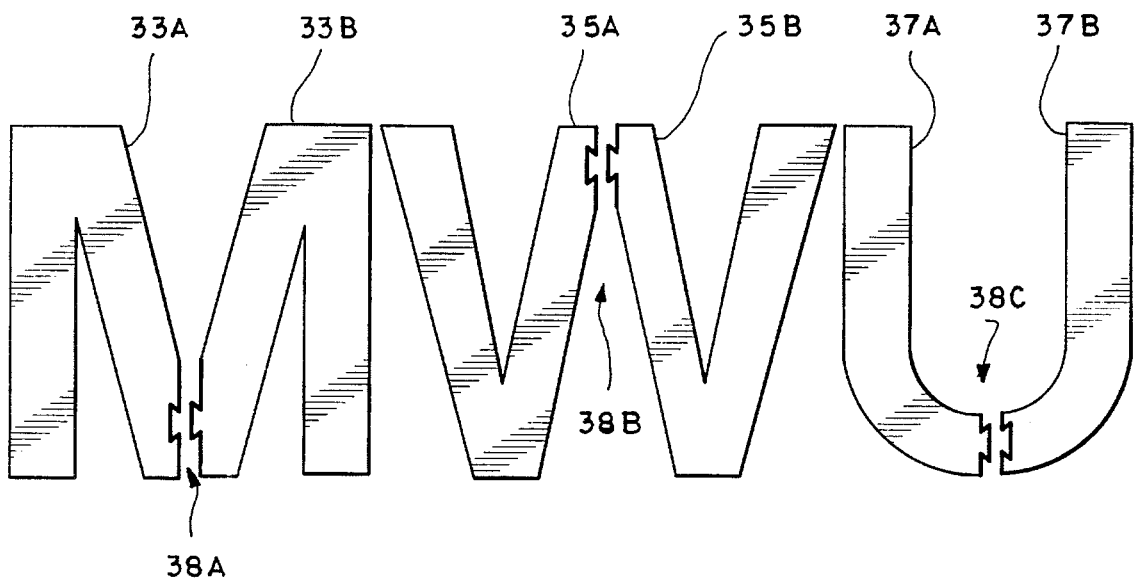
FIG. 8 is a front elevational view of detached symbols having an attachment point at the center of the symbols.

FIG. 5 and FIG. 6 of the drawings show alphanumeric symbols "six", "A" and "P" which are respectively 26, 28, 30 having double attachments which separate the symbols into upper sections 27A, 29A, 31A and respective lower sections 27B, 29B, 31B. FIG. 7 and FIG. 8 of the drawings show alphanumeric symbols "M", "W" and "U" which are respectively 32, 34, 36 having attachments that separate them into left sections 33A, 35A, 37A and respective right sections 33B, 35B, 37B. The attachments 38A, 38B, 38C are located at the center or midpoint of the symbols.

Figure 9:
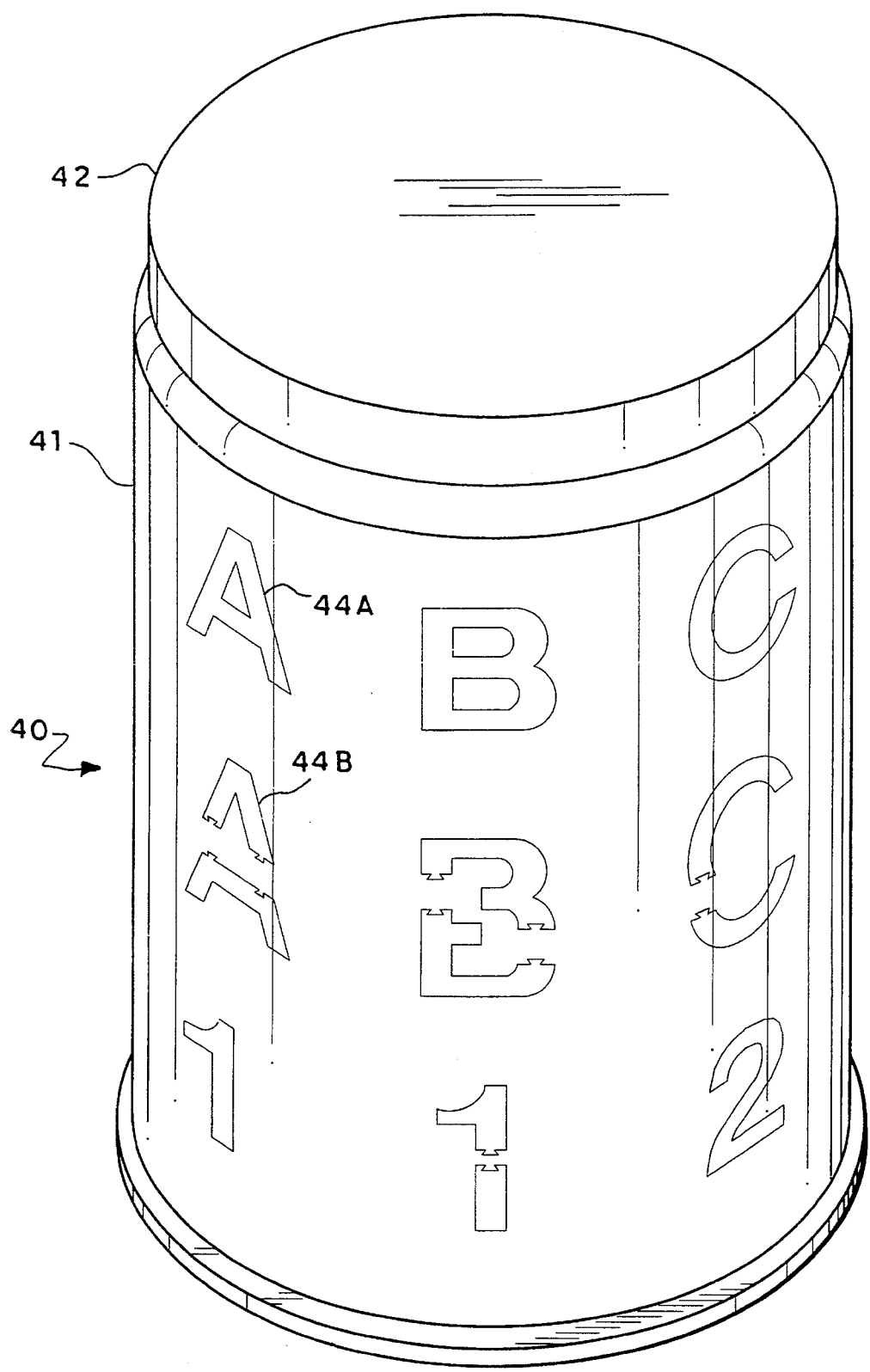
FIG. 9 is a perspective view of the container showing the alphanumeric symbols in both an attached and detached relationship.

FIG. 9 of the drawings shows a container 40 having a main section 41 and a lid 42. The container 40 is made of the same material, i.e., plastic, as the alphanumeric symbols. Disposed around the outside of the container 40 are depictions of representative alphanumeric symbols "A","B","C" and "1" shown in an attached form 44A and detached form 44B "2" is shown in an attached form. All twenty six letters of the alphabet plus numerals "0" through "9" are actually displayed along the outside of the container 40. The lid 42 is secured to the main section 41 through a snap-on lid that is easy enough for a child to open and close. As a further assistance in teaching the children how to assemble the symbols, the symbols 44A, 44B displayed on the container 40 are color coordinated to match the colors of the alphanumeric symbols as seen in FIGS. 1–8.

It is to be understood that the present invention is not limited to the sole embodiment described above, but encompasses any and all embodiments within the scope of the following claims.

I claim:

1. An educational kit comprising in combination:

a plurality of alphanumeric symbols;

said plurality of alphanumeric symbols, each being separable into a first section and a second section;

said plurality of alphanumeric symbols, each having at least one attachment means to attach said first section to said second section;

said attachment means comprising a dovetail in said first section and a groove in said second section providing a firm attachment between said first section and said second section of said plurality of alphanumeric symbols, said dovetail and groove being dimensioned and configured to interconnect in a close and tight relationship;

each of said plurality of alphanumeric symbols having a separate and distinct color;

a receptacle dimensioned and configured to contain said plurality of alphanumeric symbols, wherein said receptacle displays individual images on an outside surface that correspond to each of said plurality of alphanumeric symbols;

said individual images each having the same color as each of the corresponding plurality of alphanumeric symbols; and said receptacle having a lid secured to said receptacle by a securing means; whereby the educational kit assists in the education of children in assembling the plurality of alphanumeric symbols, recognizing each alphanumeric symbol and distinguishing each alphanumeric symbol by its distinctive color.

2. The educational kit according to claim 1, wherein at least one of said plurality of alphanumeric symbols is constructed so as to be detachable such that said first section and said second section evenly divide into a left section and a right section.

3. The educational kit according to claim 1, wherein at least one of said plurality of alphanumeric symbols is constructed so as to be detachable such that said first section and said second section evenly divide into a top section and a bottom section.

4. The educational kit according to claim 1, wherein at least one of said plurality of alphanumeric symbols is constructed so as to be detachable such that said first section and said second section evenly divide along a diagonal.

5. The educational kit according to claim 1, wherein said securing means comprises a snap lock.

6. The educational kit according to claim 1, wherein said individual images displayed on said receptacle are shown in an attached and detached configuration.

7. The educational kit according to claim 1, wherein said kit contains said first and second sections of said alphanumeric symbols which divide into left and right sections, top and bottom sections, and diagonal sections.

8. The educational kit according to claim 1, wherein said plurality of alphanumeric symbols, said receptacle and said lid are plastic.

9. The educational kit according to claim 1, wherein said plurality of alphanumeric symbols contain all the letters of the alphabet.

10. The educational kit according to claim 1, wherein said plurality of alphanumeric symbols contain the numerals 0 to 9.

11. The educational kit according to claim 1, wherein said plurality of alphanumeric symbols consists of all the letters of the alphabet and the numerals 0 to 9.

* * * * *